(12) United States Patent
Murphy et al.

(10) Patent No.: US 8,026,289 B2
(45) Date of Patent: Sep. 27, 2011

(54) FLUORINATED POLYOXYALKYLENE GLYCOL DIAMIDE SURFACTANTS

(75) Inventors: Peter Michael Murphy, Chadds Ford, PA (US); Anilkumar Raghavanpillai, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 371 days.

(21) Appl. No.: 12/255,067

(22) Filed: Oct. 21, 2008

(65) Prior Publication Data

US 2010/0099839 A1    Apr. 22, 2010

(51) Int. Cl.
*C09K 3/00* (2006.01)
*B01F 17/00* (2006.01)

(52) U.S. Cl. ........ 516/203; 516/103; 528/290; 528/292; 528/373; 252/88.2

(58) Field of Classification Search .................. 516/203, 516/106; 528/290, 292, 373; 252/88.2
See application file for complete search history.

(56) References Cited

U.S. PATENT DOCUMENTS

| | | | |
|---|---|---|---|
| 3,929,873 A | 12/1975 | Gammans | |
| 3,979,469 A | 9/1976 | Jager | |
| 4,079,084 A | 3/1978 | Houghton | |
| 4,171,282 A | 10/1979 | Mueller | |
| 4,855,025 A | 8/1989 | Gautier et al. | |
| 5,051,503 A | 9/1991 | Schlight | |
| 5,481,028 A | 1/1996 | Petrov et al. | |
| 5,759,968 A | 6/1998 | Furutani et al. | |
| 5,962,117 A | 10/1999 | Furutani et al. | |
| 6,054,615 A | 4/2000 | Qiu | |
| 6,162,521 A | 12/2000 | Falcone | |
| 6,537,662 B1 | 3/2003 | Kamrath et al. | |
| 6,860,926 B2 | 3/2005 | Ishikawa et al. | |
| 7,399,887 B1 | 7/2008 | Murphy | |
| 7,737,307 B2 * | 6/2010 | Murphy et al. | 568/615 |
| 2006/0252840 A1 | 11/2006 | Zhang et al. | |
| 2007/0225176 A1 | 9/2007 | Pope et al. | |
| 2007/0238780 A1 | 10/2007 | Lutz | |

FOREIGN PATENT DOCUMENTS

| | | |
|---|---|---|
| DE | 283994 A5 | 10/1990 |
| EP | 1505098 A1 | 2/2005 |
| FR | 2839071 A1 | 10/2003 |
| FR | 2866027 | 8/2005 |
| JP | 51123787 | 10/1976 |
| JP | 58050971 | 3/1983 |
| WO | 9827184 A1 | 6/1998 |
| WO | 0012458 A1 | 3/2000 |
| WO | 2007080055 A2 | 7/2007 |
| WO | 2008000680 A1 | 1/2008 |
| WO | 2008000681 A1 | 1/2008 |
| WO | 2008000682 A1 | 1/2008 |
| WO | 2008/118494 A2 | 10/2008 |
| WO | 2009/020907 A1 | 2/2009 |
| WO | 2009/055561 A1 | 4/2009 |

OTHER PUBLICATIONS

Tamura K. et al, Preparation of a topologically linked branch polymer containing cyclodextrin; Polymer International, (2007) v56, n9, p1115, Abstract.
Gilsing, Hans-Detlev et al, Novel fluorosurfactants. New strategies in the synthesis of surfactants containing very long perfluorinated alkyl chains; Inst. Solid State Phys., Univ. Potsdam, Potsdam, Germany (1998), 35(4), 240-247, Abstract.
Sawada, Hideo et al, Syntheses and properties of fluoroalkylated oligomers containing oligo(oxyethylene) units, Nihon Yukagakkaishi (1998), 47(7), 685-694, Abstract.
Gartiser, Thierry et al., Oligoethylene glycol chemistry: a route to nonionic perfluoroalkyl surfactants, Journal of Chemical Research, Synopses (1984), (9), 292-3, Abstract.
Hogen-Esch, Thieo, Complex formation of b-cyclodextrin and perfluorocarbon modified water-soluble polymers, Book of Abstracts, 216th ACS National Meeting, Boston, Aug. 23-27 (1998), POLY-483 Publisher: American Chemical Society, Washington, D. C., Abstract.
Peng, Ching-An et al., Polymeric Fluorosurfactant-Mediated Perfluorocarbon Emulsions, Journal of Dispersion Science and Technology (2006), 27(3), 377-387, Abstract.
Balague, J. et al., Synthesis of fluorinated telomers. Part 1. Telomerization of vinylidene fluoride with perfluoroalkyl iodides; Journal of Fluorine Chemistry, (1995) vol. 70(2), 215-223.
Honda, K., et al., Molecular aggregation structure and surface properties of poly(fluoroalkyl acrylate) thin films, American Chemical Society, Macromolecules (2005) 38(13), 5699-5705.
Trabelsi et al., J. Fluorine Chem, (1994) 69, 115-117, Abstract.
Rondestvedt, et al., J. Org Chem (1977) 42, 2680.

* cited by examiner

*Primary Examiner* — Ling Choi
*Assistant Examiner* — Chun-Cheng Wang
(74) *Attorney, Agent, or Firm* — Nancy S. Mayer

(57) ABSTRACT

A fluorinated polyoxyalkylene glycol diamide surfactant of formula 1

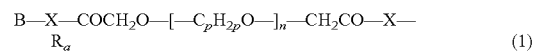

wherein
B is M or $R_a$,
M is an ionizable hydrogen, ammonium, alkali metal, or alkaline earth metal,
p is from about 2 to about 4,
n is from about 5 about 43,
each X is independently NR, $SCH_2CH_2NR$, $SO_2NRCH_2CH_2NR$, or $SO_2CH_2CH_2NR$;
R is hydrogen, or a linear or branched alkyl group $C_b H_{(2b+1)}$ wherein b is 1 to about 18,
$R_a$ is $R_f(CH_2CF_2)_d$—$(C_gH_{2g})$—; $R_f(OCF_2CF_2)_r$—$(C_gH_{2g})$—; $R_fOY$—; $R_f(CH_2)_h[(CF_2CF_2)_i(CH_2CH_2)_j]_k$—; $R_f(C_gH_{2g})$—; or $H(C_cF_{2c})$—$(C_gH_{2g})$—;
Y is $CFHCF_2O(C_wH_{2w})$—; or $CF(CF_3)CONH$—$(C_gH_{2g})$—; and
each $R_f$ is independently $C_cF_{(2c+1)}$ wherein c is 1 to about 6.

16 Claims, No Drawings

US 8,026,289 B2

FLUORINATED POLYOXYALKYLENE GLYCOL DIAMIDE SURFACTANTS

FIELD OF THE INVENTION

This invention relates to a fluorinated polyoxyalkylene glycol diamide and use thereof as a surfactant.

BACKGROUND OF THE INVENTION

Most commercially available fluorinated surfactants are produced through electrochemical fluorination or telomerization. Electrochemical fluorination utilizes anhydrous hydrofluoric acid as the fluorine source. However, industrially produced hydrofluoric acid contains impurities; which requires use of further complicated processes to remove these impurities.

Telomerization processes use tetrafluoroethylene as the starting material. However, tetrafluoroethylene is a hazardous and expensive intermediate with limited availability. The telomerization products contain a mixture of homologs which contain a distribution of different carbon chain lengths, typically containing chain lengths of from about 4 to about 20 carbons. Therefore, in order to produce fluorinated surfactants which contain a fluorinated carbon chain of fixed length, and not a mixture of various lengths, some sequential separation of telomerization products is required, as described by Erik Kissa in "Fluorinated Surfactants, Synthesis-Properties-Applications". For example, U.S. Pat. No. 6,537,662 discloses a fluorochemical which may be incorporated into a soil-resistant spin finish composition as one of the optional additives. The fluorochemical additive includes fluorochemical polyoxyethylene diamides.

There is disadvantage of using such fluorinated surfactants containing longer perfluoroalkyl chains. For example, Koji Honda et al., in "Molecular Aggregation Structure and Surface Properties of Poly(fluoroalkylacrylate) Thin Films" Macromolecules (2005), 38(13), 5699-5705, teach that the orientation of the perfluoroalkyl chains of at least 8 carbons is maintained in a parallel configuration, while for such perfluoroalkyl chains containing less than 6 carbons, reorientation occurs. This reorientation decreases performance effects for altering surface behaviors. Further, the price of fluorinated surfactant is primarily determined by the amount of fluorine incorporated in compound. Therefore, it is desirable to obtain fluorinated surfactants which can be prepared from fluorinated chemicals other than telomers. It is further desired to obtain fluorinated surfactants which contain shorter fluorinated chains or fluorinated groups and still provide essentially the same or even superior performance for altering surface behaviors. Especially desirable is lowering surface tension, and providing to liquids low surface tension, low interfacial surface tension values, and low critical micelle concentrations. The present invention provides such fluorinated surfactants.

BRIEF SUMMARY OF THE INVENTION

The present invention comprises a compound of formula (1)

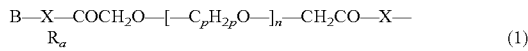

$$B-X-COCH_2O-[-C_pH_{2p}O-]_n-CH_2CO-X- \quad (1)$$
$$\phantom{B-X-COCH_2O-[-C_pH_{2p}O-]_n-CH_2CO-X-}R_a$$

wherein

B is M or $R_a$,

M is an ionizable hydrogen, ammonium, alkali metal, or alkaline earth metal, p is from about 2 to about 4, n is from about 5 to about 43, each X is independently NR, SCH$_2$CH$_2$NR, SO$_2$NRCH$_2$CH$_2$NR, or SO$_2$CH$_2$CH$_2$NR;

R is hydrogen, or a linear or branched alkyl group $C_bH_{(2b+1)}$ wherein b is 1 to about 18, $R_a$ is $R_f(CH_2CF_2)_d$—$(C_gH_{2g})$—; $R_f(OCF_2CF_2)_r$—$(C_gH_{2g})$—; $R_fOY$—; $R_f(CH_2)_h[(CF_2CF_2)_i(CH_2CH_2)_j]_k$—; $R_f(C_gH_{2g})$—; or $H(C_cF_{2c})$—$(C_gH_{2g})$—;

Y is CFHCF$_2$O(C$_w$H$_{2w}$)—; or CF(CF$_3$)CONH—(C$_g$H$_{2g}$)—;

each $R_f$ is independently $C_cF_{(2c+1)}$ wherein c is 1 to about 6;

d is 1 to about 3;

g is 1 to about 4;

r is 1 to about 4;

h is 1 to about 6;

w is from about 2 to about 12; and i, j, and k are each independently 1, 2, or 3, or a mixture thereof provided that the total number of carbon atoms in $R_f(CH_2)_h[(CF_2CF_2)_i(CH_2CH_2)_j]_k$— is from about 8 to about 22.

The present invention further comprises a method of altering the surface behavior of a liquid comprising adding to the liquid a compound of formula (1) as described above, or a mixture thereof

DETAILED DESCRIPTION OF THE INVENTION

Herein trademarks are shown in upper case.

Herein the term "twin-tailed surfactant" is used to describe a surfactant having two hydrophobic groups attached to a single connecting hydrophilic group. The two hydrophobic groups may be the same, designated as "symmetrical twin-tailed surfactant", or dissimilar, designated as "hybrid twin-tailed surfactant".

The present invention provides a fluorinated polyoxyalkylene glycol diamide surfactant, which contains fluorinated groups having no more than 6 carbons in the fluorinated group. The fluorinated polyoxyalkylene glycol diamide surfactant of the present invention unexpectedly provides very low surface tension of less than 21 mN/m at 0.1% by weight in water, preferably less than 20 mN/m at a concentration of 0.1% by weight in water, and also has low CMC values. The fluorinated polyoxyalkylene glycol diamide surfactant of the present invention is a twin-tail surfactant which contains, in sequence, a hydrophobic group, a hydrophilic group, and preferably a second hydrophobic group. Such a twin-tail, fluorinated polyoxyalkylene glycol diamide surfactant, is useful for altering surface behavior, typically for lowering surface tension, and can be used in a variety of applications, such as coatings, cleaners, oil fields, and many other applications. The surfactant is also useful in many applications involving wetting, leveling, antiblocking, foaming, and the like.

The fluorinated polyoxyalkylene glycol diamide surfactant of formula (1) of the present invention comprises at least one hydrophobic part, preferably two hydrophobic parts, which contains the partially fluorinated Ra group as described above. The compound of the present invention also comprises a water soluble hydrophilic part. The surfactants of the present invention are nonionic surfactants, which carry no electrical charge, and the water solubility is conferred by the presence of highly polar groups, polyoxyethylene, —[—C$_p$H$_{2p}$O —]$_n$ of varying length. The water solubility of such surfactants tends to increase when the value of n increases. In an aqueous medium system, the surface activity is controlled by the balance between the hydrophilic and hydrophilic components.

One of the advantages of using the surfactants comprising the fluorinated polyoxyalkylene glycol diamide of the present invention in altering surface behavior is to achieve the same or even superior performance while using reduced concentration of the fluorinated surfactant having reduced fluorine content, thus increasing the "fluorine efficiency". The term "fluorine efficiency" as used herein means the ability to use a minimum amount of fluorosurfactant to obtain a desired surface effect or surface property when applied to a substrate, or to obtain better performance using the same level of fluorine. Further, the fluorinated polyoxyalkylene glycol diamide surfactant of the present contains shorter fluorinated chains or fluorinated groups, which unexpectedly provides essentially the same or even superior performance in altering surface behavior when compared to conventional surfactants containing longer fluorinated chains.

The fluorinated polyoxyalkylene glycol diamide surfactants of the present invention have the structure of formula (1):

$$B-X-COCH_2O-[-C_pH_{2p}O-]_n-CH_2CO-X- \atop R_a \qquad (1)$$

wherein

B is M or $R_a$,

M is an ionizable hydrogen, ammonium, alkali metal, or alkaline earth metal, p is from about 2 to about 4, n is from about 5 to about 43, each X is independently NR, SCH$_2$CH$_2$NR, SO$_2$NRCH$_2$CH$_2$NR, or SO$_2$CH$_2$CH$_2$NR;

R is hydrogen, or a linear or branched alkyl group $C_bH_{(2b+1)}$ wherein b is 1 to about 18, $R_a$ is $R_f(CH_2CF_2)_d-(C_gH_{2g})-$; $R_f(OCF_2CF_2)_r-(C_gH_{2g})-$; $R_fOY-$; $R_f(CH_2)_h[(CF_2CF_2)_i(CH_2CH_2)_j]_k-$; $R_f(C_gH_{2g})-$; or $H(C_cF_{2c})-(C_gH_{2g})-$;

Y is $CFHCF_2O(C_wH_{2w})-$; or $CF(CF_3)CONH-(C_gH_{2g})-$;

each $R_f$ is independently $C_cF_{(2c+1)}$ wherein c is 1 to about 6;

d is 1 to about 3;

g is 1 to about 4;

r is 1 to about 4;

h is 1 to about 6;

w is from about 2 to about 12; and i, j, and k are each independently 1, 2, or 3, or a mixture thereof; provided that the total number of carbon atoms in $R_f(CH_2)_h[(CF_2CF_2)_i(CH_2CH_2)_j]_k-$ is from about 8 to about 22.

Preferred compounds of formula (1) include those wherein n is from about 6 to about 32, more preferably those wherein n is from about 6 to about 30, and more preferably those wherein n is 10 to 12. Also preferred are those where X is NR or SCH$_2$CH$_2$NR. Preferred embodiments of the compound of formula (1) are those wherein $R_a$ is $R_f(C_gH_{2g})-$, $R_f$ is $C_cF_{(2c+1)}$ wherein c is 4 or 6, and g is 1 or 2. Preferred embodiments of the compound of formula (1) are those wherein $R_a$ is $R_f(CH_2CF_2)_d-(C_gH_{2g})-$, $R_f$ is $C_cF_{(2c+1)}$ wherein c is 4 or 6, d is 1 or 2, and g is 2. Also preferred are those compounds wherein $R_a$ is $R_f(OCF_2CF_2)_r(C_gH_{2g})-$, $R_f$ is $C_cF_{(2c+1)}$ wherein c is 2 or 3, r is 1, 2 or 3, and g is 2. Another preferred embodiment of the compounds of formula (1) are those wherein $R_a$ is $R_f(OCF_2CF_2)_r(C_gH_{2g})-$, $R_f$ is $C_cF_{(2c+1)}$ wherein c is 3, r is 1, and g is 2. Also preferred are those compounds of formula (1) wherein $R_a$ is $R_fOY-$, $R_f$ is $C_cF_{(2c+1)}$ wherein c is 1, 2 or 3, Y is $CFHCF_2O(C_wH_{2w})-$, and w is 2, 3 or 4. Additional preferred compounds are compounds of formula (1) wherein $R_a$ is $R_fOY-$, $R_f$ is $C_cF_{(2c+1)}$ wherein c is 3, Y is $CF(CF_3)CONH-(C_gH_{2g})-$, and g is 2. Also preferred are the compounds of formula (1) wherein $R_a$ is $R_f(CH_2)_h[(CF_2CF_2)_i(CH_2CH_2)_j]_k-$; $R_f$ is $C_cF_{(2c+1)}$ wherein c is 1, 2, or 3, h is 2, k is 1, 2 or 3, i and j are each 1, and X is O or SCH$_2$CH$_2$O.

The fluorinated polyoxyalkylene glycol diamides of formula (1) of the present invention are synthesized by reacting a carboxylic acid with an amine in the presence of a coupling agent such as dicyclohexylcarbodiimide (DCC) or 1-[3-(dimethylamino)propyl]-3-ethylcarbodiimide hydrochloride (EDCI) at room temperature. The diamides also can be prepared by refluxing carboxylic acid with an amine with an acid catalyst such as p-toluenesulfonic acid. Alternatively, the carboxylic acids can be transformed to corresponding acid chloride and upon reaction of the acid chloride with amines in the presence of a base (Et$_3$N) the amides are produced.

Polyalkylene glycol dicarboxylic acids of molecular weights of about –Mw 250, 400, 600, 1000 and 1450 are used for the synthesis of amides. Polyalkylene glycol dicarboxylic acids of –Mw 250 and 600 are commercially available (Aldrich Chemical Co., Milwaukee, Wis.) whereas Mw 400, 1000 and 1450 are synthesized by the literature procedure by the oxidation of corresponding polyalkylene glycol with Jones reagent. (Lele, B. S.; Kulkarni, M. G., Journal of Applied Polymer Science, Vol. 70, 883-890, 1008) or by the oxidation of the glycol such as disclosed in U.S. Pat. No. 3,929,873 (1975). Preferred are dicarboxylic acids of formula $HOOCCH_2O-(CH_2CH_2O)_n-CH_2COOH$ wherein n is from about 6 to about 32, in particular wherein n is 6, 10, 20 or 30.

For example, compounds of formula (1) are prepared by reacting a polyalkylene glycol dicarboxylic acid with at least one of the following amines, which correspond to $R_a-X$ in formula (1) after removal of one hydrogen during the reaction.

$CF_3CF_2CF_2CF_2-CH_2CH_2-NH_2$, $CF_3CF_2CF_2CF_2CF_2CF_2-CH_2CH_2-NH_2$, $CF_3CF_2CF_2CF_2CF_2CF_2CF_2CF_2-CH_2CH_2-NH_2$, $CF_3CF_2CF_2CF_2-CH_2CH_2CH_2-NH_2$, $CF_3CF_2CF_2CF_2CF_2CF_2-CH_2CH_2CH_2-NH_2$, $CF_3CF_2CF_2CF_2CF_2CF_2-CH_2-NH_2$, $CF_3CF_2CF_2CF_2-CH_2-NH_2$, $CF_3CF_2CF_2CF_2-CH_2CF_2-CH_2CH_2-NH_2$, $CF_3CF_2CF_2CF_2CF_2CF_2-CH_2CF_2-CH_2CH_2-NH_2$, $CF_3CF_2CF_2CF_2CF_2CF_2CF_2CF_2-CH_2CF_2-CH_2CH_2-NH_2$, $CF_3CF_2CF_2CF_2-CH_2CF_2CH_2CF_2-CH_2CH_2-NH_2$, $CF_3CF_2CF_2CF_2CF_2CF_2-CH_2CF_2CH_2CF_2-CH_2CH_2-NH_2$, $CF_3CF_2CF_2-O-CF_2CF_2CH_2CH_2-NH_2$, $CF_3CF_2-O-CF_2CF_2CH_2CH_2-NH_2$, $CF_3-O-CF_2CF_2CH_2CH_2-NH_2$, $CF_3CF_2CF_2$—O—$CHFCF_2OCH_2CH_2$—$NH_2$, $CF_3CF_2$—O—$CHFCF_2OCH_2CH_2$—$NH_2$, $CF_3$—O—$CHFCF_2OCH_2CH_2$—$NH_2$, $CF_3CF_2CF_2$—O—$CHFCF_2OCH_2CH_2CH_2$—$NH_2$, $CF_3CF_2$—O—$CHFCF_2OCH_2CH_2CH_2$—$NH_2$, $CF_3$—O—$CHFCF_2OCH_2CH_2CH_2$—$NH_2$, $CF_3CF_2CF_2$—O—$CHFCF_2OCH_2CH_2CH_2CH_2$—$NH_2$, $CF_3CF_2$—O—$CHFCF_2OCH_2CH_2CH_2CH_2$—$NH_2$, $CF_3$—O—$CHFCF_2OCH_2CH_2CH_2CH_2$—$NH_2$, $CF_3CF_2CF_2CF_2$—$CH_2CH_2$—S—$CH_2CH_2$—$NH_2$, $CF_3CF_2CF_2CF_2CF_2CF_2$—$CH_2CH_2$—S—$CH_2CH_2$—$NH_2$, $CF_3CF_2CH_2CH_2CF_2CF_2CH_2CH_2$—$NH_2$, $CF_3CF_2CH_2CH_2CF_2CF_2CH_2CH_2CF_2CF_2CH_2CH_2$—$NH_2$, $CF_3CF_2CH_2CH_2CF_2CF_2CH_2CH_2CF_2CF_2CH_2CH_2CF_2CF_2CH_2$—$NH_2$, $CF_3CF_2CF_2$—O—$CF(CF_3)$—CONH—$CH_2CH_2$—$NH_2$, $CF_3CF_2CF_2$—O—$CF(CF_3)$—$CONCH_3$—$CH_2CH_2$—$NH_2$, $CF_3CF_2CF_2$—$CH_2CH_2$—$SO_2NH$—$CH_2CH_2$—$NH_2$, $CF_3CF_2CF_2CF_2CF_2$—$CH_2CH_2$—$SO_2NH$—$CH_2CH_2$—$NH_2$, $CF_3CF_2CF_2CF_2CF_2CF_2CF_2$—$CH_2CH_2$—$SO_2NH$—$CH_2CH_2$—$NH_2$, $CF_3CF_2CF_2CF_2$—$CH_2CH_2$—$SO_2NCH_3$—$CH_2CH_2$—$NH_2$, $CF_3CF_2CF_2CF_2CF_2CF_2$—$CH_2CH_2$—$SO_2NCH_3$—$CH_2CH_2$—$NH_2$, $CF_3CF_2CF_2CF_2CF_2CF_2CF_2$—$CH_2CH_2$—$SO_2NCH_3$—$CH_2CH_2$—$NH_2$, $CF_3CF_2CF_2CF_2$—$SO_2NH$—$CH_2CH_2$—$NH_2$, $CF_3CF_2CF_2CF_2CF_2CF_2$—$SO_2NH$—$CH_2CH_2$—$NH_2$, $CF_3CF_2CF_2CF_2CF_2CF_2CF_2CF_2$—$SO_2NH$—$CH_2CH_2$—$NH_2$, $CF_3CF_2CF_2CF_2$—$SO_2NCH_3$—$CH_2CH_2$—$NH_2$, $CF_3CF_2CF_2CF_2CF_2CF_2$—$SO_2NCH_3$—$CH_2CH_2$—$NH_2$, $CF_3CF_2CF_2CF_2CF_2CF_2CF_2CF_2$—$SO_2NCH_3$—$CH_2CH_2$—$NH_2$, $HCF_2CF_2CF_2CF_2$—$CH_2$—$NH_2$, $HCF_2CF_2CF_2CF_2CF_2CF_2$—$CH_2$—$NH_2$, $HCF_2CF_2CF_2CF_2CF_2CF_2CF_2CF_2$—$CH_2$—$NH_2$, $CF_3CF_2OCF_2CF_2$—$CH_2CH_2$—$NH_2$, $CF_3CF_2OCF_2CF_2OCF_2CF_2$—$CH_2CH_2$—$NH_2$, $CF_3CF_2OCF_2CF_2OCF_2CF_2OCF_2CF_2$—$CH_2CH_2$—$NH_2$, $CF_3CF_2OCF_2CF_2OCF_2CF_2$—$CH_2CH_2$—$NH_2$, $CF_3CF(CF_3)OCF_2CF_2$—$CH_2CH_2$—$NH_2$, $F(CF_2)_m(CH_2)_q[(CF_2CF_2)_i(CH_2CH_2)_j]_k$—$NH_2$, and $F(CF_2)_m(CH_2)_q[(CF_2CF_2)_i(CH_2CH_2)_j]_k$—S—$CH_2CH_2$—$NH_2$.

Some above examples of fluorinated amines used in the present invention are available from Aldrich Chemical Company, Milwaukee, Wis.; Matrix Scientific, Columbia, S.C.; or from E. I. du Pont de Nemours and Company, Wilmington, Del. The preparations of other amines are described below:

Compounds of formula (1) wherein Ra is $H(C_cF_{2c})$—$(C_gH_{2g})$— and $R_f$—$(C_gH_{2g})$— are available by synthesis using well-known synthetic methods corresponding from readily available iodides. For instance, 1H,1H,2H,2H-perfluoroalkyl amines are synthesized from corresponding iodides via treatment with sodium azide followed by reduction using Raney Ni as described in the literature procedure (Trabelsi, H.; Szoenyi, F.; Michelangeli, N.; Cambon, A. *J. Fluorine Chem.*, 1994, 69, 115-117). 1H,1H,2H,2H,3H,3H-perfluorononyl amine was obtained by the hydrogenation of 3-perfluorohexylpropionitrile with Raney-Ni (Qiu, W., U.S. Pat. No. 6,054,615). The 2-(1H,1H,2H,2H-perfluoroalkylthio)ethylamines are prepared by the reaction of 1H,1H,2H,2H-perfluoroalkyl iodides with 2-aminoethanethiol as described in Rondestvedt, C. S., Jr.; et al, *J. Org. Chem.* 1977, 42, 2680. In a similar manner, reaction of 1H,1H,2H,2H-perfluoroalkyl iodides with 3-aminopropanethiol or 4-aminobutanethiol provides the corresponding 3-(1H,1H,2H,2H-perfluoroalkylthio)propylamines and 4-(1H,1H,2H,2H-perfluoroalkylthio)butylamines, respectively. Higher homologs of the ω-aminoalkylthiols can be treated in a similar manner.

Compounds of formula (1) containing the $R_a$ group $R_f(CH_2CF_2)_d$—$(C_gH_{2g})$— wherein d is 1 to 3 and g is 1 to 4 are prepared from the fluorinated amines of the type formula (II):

$$R_f$$—$(CH_2CF_2)_q(CH_2CH_2)_r$—$NH_2$ \qquad (II)

wherein $R_f$ is a linear or branched perfluoroalkyl group having 2 to 6 carbon atoms, subscript q is an integer of 1 to 3, and r is 1 to 2. These amines are available by synthesis according to Scheme 1 wherein $R_f$ and d are as defined for Formula (1), and q is 1 or 2.

Scheme 1

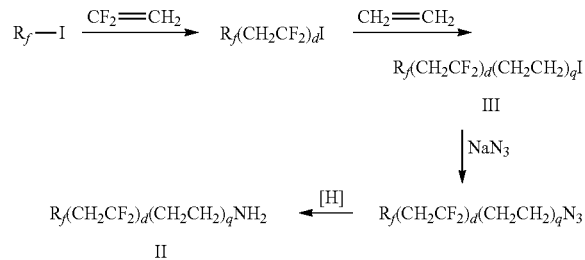

The reaction of vinylidene fluoride with linear or branched perfluoroalkyl iodides produces compounds of the structure $R_f(CH_2CF_2)_dI$, wherein, d is 1 or more and $R_f$ is a $C_1$ to $C_6$ perfluoroalkyl group. For example, see Balague, et al, "Synthesis of fluorinated telomers, Part 1, Telomerization of vinylidene fluoride with perfluoroalkyl iodides", J. Fluorine Chem. (1995), 70(2), 215-23. The specific telomer iodides are isolated by fractional distillation. The telomer iodides are treated with ethylene by procedures described in U.S. Pat. No. 3,979,469 to provide the telomer ethylene iodides (III of Scheme 1) wherein q is 1 to 3 or more. The iodides (III) are then transformed to the corresponding amines by the transformation to azide using $NaN_3$, followed by catalytic hydrogenation using Raney-Ni.

Compounds of formula (1) containing the group $R_f(OCF_2CF_2)_r(C_gH_{2g})$— are obtained from precursor fluorinated amines of the type of formula $R_fOCF_2CF_2$—$CH_2CH_2NH_2$ which are available by the following series of reactions wherein $R_f$ is a linear or branched $C_1$ to $C_6$ perfluoroalkyl optionally interrupted by one to three oxygen atoms and q is an integer of 1 to 3:

panol followed by transforming the iodide to azide, and then reducing to the amine. The fluorinated vinyl ether used in the above reaction is made by various methods. These methods include making fluorinated vinyl ethers by reacting a 2-alkoxypropionyl fluoride in a stationary bed of a metal carbonate, a tubular reactor filled with dried metal carbonate and equipped with a screw blade running through the tube, or a fluidized bed of metal carbonate. US Patent Application 2007/0004938 describes a process to produce fluorinated vinyl ether by reacting a 2-alkoxypropionyl fluoride with a metal carbonate under anhydrous conditions in a stirred bed reactor at a temperature above the decarboxylation temperature of an intermediate carboxylate to produce fluorinated vinyl ether. Preferred ethers include those of formula $R_f$—O—CF=$CF_2$ wherein $R_f$ is a perfluoroalkyl of two to six carbons. Examples of fluorinated vinyl ethers suitable for use include $CF_3$—O—CF=$CF_2$, $CF_3CF_2$—O—CF=$CF_2$, $CF_3CF_2CF_2$—O—CF=$CF_2$, and $CF_3CF_2CF_2CF_2$—O—CF=$CF_2$, each of which are available from E. I. du Pont de Nemours and Company, Wilmington, Del.

Compounds of formula (1) containing the group $R_fOCF(CF_3)CONH$—$(C_gH_{2g})$— are prepared using a fluorinated Scheme 2

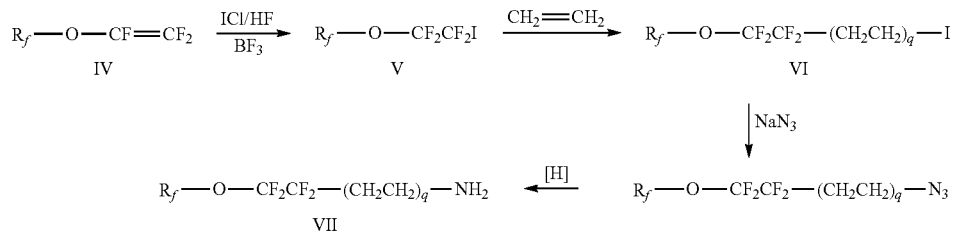

The perfluoroalkyl ether iodides of formula V of Scheme 2 above can be made by the procedure described in U.S. Pat. No. 5,481,028, which discloses the preparation of compounds of formula V of Scheme 2 from perfluoro-n-propyl vinyl ether. The perfluoalkyl ether iodide of formula V of Scheme 2 is reacted with an excess of ethylene at an elevated temperature and pressure. While the addition of ethylene can be carried out thermally, the use of a suitable catalyst is preferred. Preferably the catalyst is a peroxide catalyst such as benzoyl peroxide, isobutyryl peroxide, propionyl peroxide, or acetyl peroxide. More preferably the peroxide catalyst is benzoyl peroxide. The temperature of the reaction is not limited, but a temperature in the range of 110° C. to 130° C. is preferred. The reaction time can vary with the catalyst and reaction conditions, but 24 hours is usually adequate. The product is purified by any means that separates unreacted starting material from the final product, but distillation is preferred. Satisfactory yields up to 80% of theory have been obtained using about 2.7 mols of ethylene per mole of perfluoalkyl ether iodide, a temperature of 110° C. and autogenous pressure, a reaction time of 24 hours, and purifying the product by distillation. The perfluoroalkylether ethylene iodides of formula VI of Scheme 2 are then transformed to the corresponding amines VII by the transformation to azide using $NaN_3$, followed by catalytic hydrogenation using Raney-Ni.

Compounds of formula (1) containing the group $R_fOCFHCF_2O(C_wH_{2w})$— wherein w is from about 2 to about 12, are prepared from the amine of formula $R_fOCFHCF_2O(C_wH_{2w})NH_2$. These amines are made by the reaction of a fluorinated vinyl ether with a 2-iodoethanol or 3-iodoproamine having formula $R_fOCF(CF_3)CONH$—$(C_gH_{2g})NH_2$ wherein $R_f$ and g are as defined in formula (1). These fluorinated amines are prepared by the reaction of the corresponding fluorinated acyl fluoride with excess diamines. Preferred fluorides are those containing a perfluoroalkyl group having two to six carbons. This reaction is conducted at a temperature of from about −30° C. to about 40° C., preferably at between about 5° C. to about 25° C. Suitable solvents for this reaction include tetrahydrofuran, methyl isobutyl ketone, acetone, $CHCl_3$, $CH_2Cl_2$, or 2-methoxyethyl ether, diethyl ether.

Compounds of formula (1) containing the group $R_f(CH_2)_h[(CF_2CF_2)_i(CH_2CH_2)_j]_k$— are obtained by preparation of fluorinated amines of the formula $R_f(CH_2)_h[(CF_2CF_2)_i(CH_2CH_2)_j]_k NH_2$, wherein $R_f$ is a $C_2$ to $C_6$ perfluoroalkyl, subscript h is 1 to about 6, and subscripts i, j, and k are each independently 1, 2, 3, or a mixture thereof. These amines are prepared from oligomeric azides by reduction using hydrazine hydrate and Ni-Raney as per a modified literature procedure (Trabelsi, H.; Szoenyi, F.; Michelangeli, N.; Cambon, A. J. Fluorine Chem., 1994, 69, 115-117). Transformation of oligomer azide to amine is performed in a mixed solvent system comprising 1:1 water and ethanol using hydrazine hydrate/Ni-Raney at 60° for 12 hours and sodium azide.

The sulfur-containing amines of $R_f(CH_2)_h[(CF_2CF_2)_i(CH_2CH_2)_j]_k$—S $CH_2CH_2NH_2$ of the present invention, are prepared from oligomeric iodides by the displacement reaction with 2-aminoethanethiol as per the literature procedure. (Rondestvedt, C. S., Jr.; Thayer, G. L., Jr., J. Org. Chem. 1977, 42, 2680). The oligomeric iodides were refluxed with 2-mercaptoethylamine hydrochloride and sodium hydroxide in tert-butanol for 12 hours to obtain the corresponding oligomeric aminoethyl sulfide.

The iodides of formula $R_f(CH_2)_h[(CF_2CF_2)_i(CH_2CH_2)_j]_kI$ wherein $R_f$, and subscripts h, i, j, and k are as defined above are preferably prepared by oligomerization of $C_nF_{2n+1}C_2H_4I$, $C_nF_{2n+1}CH_2I$ or $C_nF_{2n+1}I$ wherein n is 1 to about 6 using a mixture of ethylene and tetrafluoroethylene. The reaction can be conducted at any temperature from room temperature to about 150° C. with a suitable radical initiator. Preferably the reaction is conducted at a temperature of from about 40° to about 100° C. with an initiator which has about a 10 hour half-life in that range. The feed ratio of the starting materials in the gas phase, that is the moles of $C_nF_{2n+1}C_2H_4I$, $C_nF_{2n+1}CH_2I$ or $C_nF_{2n+1}I$ wherein n is 1 to about 6, versus the combined moles of ethylene and tetrafluoroethylene, can be used to control conversion of the reaction. This mole ratio is from about 1:3 to about 20:1, preferably from about 1:2 to 10:1, more preferably from about 1:2 to about 5:1 The mole ratio of ethylene to tetrafluoroethylene is from about 1:10 to about 10:1, preferably from about 3:7 to about 7:3, and more preferably from about 4:6 to about 6:4.

If desired, the major chemicals in the reaction mixture described above can be separated into individual components by differences in solubilities, melting points, vapor pressures and other features. For example, it has been found that the relative solubilities of such components in acetonitrile and tetrahydrofuran are useful in such purifications. Other solvents and methods can also be used, as readily determined by those skilled in the art.

One of the advantages of the present invention is that the non-ionic fluorinated polyoxyalkylene glycol diamide surfactants of the present invention are synthesized in a way that avoids reacting polyalkylene glycol directly with fluorinated alcohol or thiol-alcohol, thus simplifying their synthesis. These non-ionic surfactants of the present invention are biodegradable easily in the environment due to the hydrolysis of the ester linking groups and the ready biodegradability of the polyoxyalkylene glycol dicarboxylic acid portion of the surfactant molecules.

The efficiency of the fluorinated surfactants, for example, in surface tension reduction, is proportional to the fluorinated carbon chain length of the fluorinated surfactants. Increasing the fluorinated carbon chain length increases the efficiency of surface tension reduction. The fluorinated polyoxyalkylene glycol diamide surfactant of the present invention also increases the "fluorine efficiency" by using a minimum amount of the hereinabove described fluorinated polyoxyalkylene glycol diamide surfactant and using low level of fluorine to obtain the desired surfactant effects.

The present invention further comprises a method of altering surface behavior of a liquid comprising adding to the liquid a compound of formula (1) ads described above. The present invention includes the use of the fluorinated polyoxyalkylene glycol diamide surfactant for altering surface behavior, typically for lowering surface tension and critical micelle concentration (CMC) values in a variety of applications, such as coating, cleaners, oil fields, and many other applications. Non-ionic surfactants are important fluorosurfactants and provide to liquids low surface and interfacial surface tension values and low CMC. They are useful in many applications involving wetting, leveling, antiblocking, foaming, penetration, spreading, flowing, emulsification and dispersion stabilization, and the like. Types of surface behavior which can be altered using the method of the present invention include wetting, penetration, spreading, leveling, flowing, emulsifying, dispersing, repelling, releasing, lubricating, etching, bonding, and stabilizing. Types of liquids which can be used in the method of the present invention include a coating composition, latex, polymer, floor finish, ink, emulsifying agent, foaming agent, release agent, repellency agent, flow modifier, film evaporation inhibitor, wetting agent, penetrating agent, cleaner, grinding agent, electroplating agent, corrosion inhibitor, etchant solution, soldering agent, dispersion aid, microbial agent, pulping aid, rinsing aid, polishing agent, personal care composition, drying agent, antistatic agent, floor finish, or bonding agent.

The fluorinated polyoxyalkylene glycol diamide surfactants of the present invention are useful in a variety of applications where a low surface tension is desired, such as coating formulations for glass, wood, metal, brick, concrete, cement, natural and synthetic stone, tile, synthetic flooring, paper, textile materials, plastics, and paints. The surfactants of the present invention are useful in waxes, finishes, and polishes to improve wetting, leveling, and gloss for floors, furniture, shoe, and automotive care. The surfactants of the present invention are useful in a variety of aqueous and non-aqueous cleaning products for glass, tile, marble, ceramic, linoleum and other plastics, metal, stone, laminates, natural and synthetic rubbers, resins, plastics, fibers, and fabrics.

The surfactants and method of the present invention are suitable for the use in agricultural compositions. The surfactants of the present invention are useful as wetting agents for compositions containing herbicides, weed killers, hormone growth regulators, parasiticides, insecticides, germicides, bactericides, nematocides, microbiocides, defoliants or fertilizers, therapeutic agents, antimicrobials. The surfactants of the present invention are also suitable as a wetting agent for foliage, for live stock dips and to wet live stock skins; and as an ingredient in sanitizing, discoloring and cleaning compositions, and in insect repellent compositions.

The surfactants and method of the present invention are suitable for the use in compositions for fluorochemical blood substitutes, textile treatment baths, fiber spin finishes, personal care products (including like shampoos, conditioners, creams, rinses), cosmetic products for the skin (such as therapeutic or protective creams and lotions, oil and water repellent cosmetic powders, deodorants and anti-perspirants), nail polish, lipstick, toothpastes, fabric care products (such as stain pretreatments and/or stain removers for clothing, carpets and upholstery), laundry detergents, rinse-aid (for car washes and in automatic dishwashers).

The surfactants and method of the present invention are further suitable for the use in the petroleum and gas industries as a wetting agent and for oil well treatments (including drilling muds and additives to improve tertiary oil well recovery, as well as in extreme pressure lubricants and as a lubricating cuffing oil improver, to improve penetration times), and as a treatment agent to prevent and remove film evaporation and gas/oil blocking for gas, gasoline, jet fuel, solvents and hydrocarbons.

The surfactants and method of the present invention are further suitable for the use in writing inks, printing inks, photography developer solutions, fighting forest fires, dry chemical fire extinguishing agents, aerosol-type fire extinguishers, thickening agents to form gels for solidifying or encapsulating medical waste, and photoresists, developers, cleaning solutions, oxide etching compositions, developers, polishers, and resist inks in the manufacturing, processing, and handling of semiconductors and electronics.

The surfactants and method of the present invention are further suitable for the use in textile and leather industries as a wetting agent, antifoaming agent, penetrating agent or emulsifying agent; or as a lubricant for textiles, nonwoven fabrics and leather treatment; for fiber finishes for spreading, and uniformity; as a wetting agent for dyeing; as a binder in nonwoven fabrics; and as a penetration additive for bleaches.

The surfactants and method of the present invention are further suitable for the use in the mining and metal working industries, in the pharmaceutical industry, automotives, building maintenance and cleaning, in household, cosmetic and personal products, and in photography and graphic arts to provide improved surface effects.

The surfactants and method of the present invention can be incorporated into products that function as antifogging agents for glass surfaces and photography films, and as antistatic agent for magnetic tapes, phonograph records, floppy disks, disk drives, rubber compositions, PVC, polyester film, photography films, and as surface treatments for optical elements (such as glass, plastic, or ceramic beads).

The surfactants and method of the present invention are also useful as foam control agents in polyurethane foams, spray-on oven cleaners, foamed kitchen and bathroom cleansers and disinfectants, aerosol shaving foams, and in textile treatment baths.

The surfactants and method of the present invention are useful as emulsifying agents for polymerization, particularly of fluoromonomers, as latex stabilizers, as mold release agents for silicones, photoemulsion stabilizers, inorganic particles, and pigments.

The surfactants and method of the present invention provide several unexpected advantages. The compounds are not prepared by electrochemical fluorination, and many are not prepared by telomerization. Thus the formation of large amounts of impurities is avoided, and products containing a mixture of homologues are not obtained. The surfactants of the present invention are more fluorine efficient than typical telomerization derived products. The lower level of fluorine present in the compounds of formula (1) of the present invention is more economical, but provides equivalent or superior performance compared to conventional surfactants containing higher levels of fluorine.

Materials and Test Methods

Materials

All solvents and reagents, unless otherwise indicated, were purchased from Sigma-Aldrich, Milwaukee, Wis., and used directly as supplied. Polyalkylene glycol dicarboxylic acids of ~Mw 250 and 600 are commercially available (Aldrich Chemical Co., Milwaukee, Wis.) whereas Mw 400, 1000 and 1450 are synthesized by the literature procedure by the oxidation of corresponding polyalkylene glycol with Jones reagent. (Lele, B. S.; Kulkarni, M. G., Journal of Applied Polymer Science, Vol. 70, 883-890, 1008). 1H,1H-perfluoroheptylamine was obtained from Matrix Scientific, Columbia, S.C. 1H,1H,2H,2H-perfluorooctylamine and 1H,1H,2H,2H-perfluorohexylamine were synthesized from the corresponding commercially available 1H,1H,2H,2H perfluoroalkyl iodides (E. I. du Pont de Nemours and Company, Wilmington Del.) via the azide followed by reduction using Raney Ni as described in the literature procedure (Cambon, et al., *J. Fluorine Chem.*, 1994, 69, 115-117). 2-(1H,1H,2H,2H-perfluorooctylthio)ethylamine and 2-(1H,1H,2H,2H-perfluorohexylthio)ethylamine were prepared by the reaction of 1H,1H,2H,2H-perfluoroalkyl iodides with 2-aminoethanethiol as per the literature procedure (Rondestvedt, C. S., Jr.; Thayer, G. L., Jr. *J. Org. Chem.* 1977, 42, 2680). $^1$H and $^{19}$F NMR spectra were recorded on a Brucker DRX 400 or 500 Spectrometer. Chemical shifts have been reported in ppm (micrograms/g) relative to an internal reference ($CDCl_3$, $CFCl_3$ or TMS Test Method 1—Measurement of the Critical Micelle Concentration (CMC) and the Surface Tension beyond CMC Surface tension was measured using a Kruess Tensiometer, K11 Version 2.501 in accordance with instructions with the equipment. The Wilhelmy Plate method was used. A vertical plate of known perimeter was attached to a balance, and the force due to wetting was measured. Ten replicates were tested of each dilution, and the following machine settings were used: Method: Plate Method SFT; Interval: 1.0 s; Wetted length: 40.2 mm; Reading limit: 10; Min Standard Deviation: 2 dynes/cm; Gr. Acc.: 9.80665 m/s^2.

The Critical Micelle Concentration (CMC) is defined as the concentration of surfactants above which micelles are spontaneously formed, at which increased concentrations of surfactant essentially no longer reduce the surface tension. To determine CMC, the surface tension was measured as a function of surfactant concentration. Surface tension was then plotted vs. log concentration. The resulting curve had a nearly horizontal portion at concentrations higher than the CMC and had a negative steep slope at concentrations less than the CMC. The CMC was calculated as that concentration of the curve where the flat portion and the extrapolated steep slope intersected. The Surface Tension beyond CMC was the value in the flat portion of the curve. The CMC should be as low as possible to provide the lowest cost for effective performance.

Test Method 2—Wetting and Leveling Test

The wetting and leveling ability of the samples was tested by adding each sample to a floor polish (RHOPLEX® 3829, Rohm & Haas, Spring House, Pa.) and applying the mixture to half of a 12 inch×12 inch (30.36 cm×30.36 cm) vinyl tile stripped with Comet® cleaner. A 1% by weight solution of the surfactant to be tested was prepared by dilution with deionized water. Following the manufacturer protocols, a 100 g portion of the RHOPLEX® 3829 formulation was prepared, followed by addition of 0.75 g of the 1% by weight surfactant solution, to provide a test floor polish.

The test floor polish was applied to a tile by placing a 3 mL portion of the test polish in the center of the tile, spreading the solution from top to bottom using an applicator, and finally placing a large "X" across half of the tile, using the applicator. The tile was allowed to dry for 30 minutes. A total of 5 coats was applied. After each coat, the tile was rated on a 1 to 5 scale (1 being the worst, 5 the best) on the surfactant's ability to promote wetting and leveling of the polish on the tile surface. The rating was determined based on comparison of a tile treated with the floor polish that contained no fluorosurfactant or leveling aids according to the following scale:

TABLE 1

| | Subjective Tile Rating Scale |
|---|---|
| 1 | Uneven surface coverage of the film, significant streaking and surface defects |
| 2 | Visible streaking and surface defects, withdrawal of the film from the edges of the tile |
| 3 | Numerous surface defects and streaks are evident but, generally, film coats entire tile surface |
| 4 | Minor surface imperfections or streaking |
| 5 | No visible surface defects or streaks |

EXAMPLES

Example 1

A 250 mL flask containing t-butanol (50 mL), sodium hydroxide (6.0 g) 2-aminoethanethiol (11.5 g) under nitrogen atmosphere was heated to 80° C. and 1H,1H,2H,2H perfluorohexyl iodide (47.4 g) was added dropwise. The mixture was heated at 80° C. for 2 h, allowed to cool and poured into cold water (200 mL). The organic layer was separated and the aqueous layer extracted with $CH_2Cl_2$ (2×50 mL). The combined organic layer was washed with water (1×100 mL) and dried over anhydrous $MgSO_4$. Purification by distillation produced 29.3 g of 2-(1H,1H,2H,2H-perfluorohexylthio)ethylamine ($C_4F_9CH_2CH_2SCH_2CH_2NH_2$) as a clear liquid. $^1H$ NMR ($CDCl_3$): δ 2.82 (t, J=6 Hz, 2H), 2.67 (tm, J=9 Hz, 2H), 2.59 (t, J=6 Hz, 2h), 2.31 (m, 2H); $^{19}F$ NMR ($CDCl_3$): δ −81.6 (m, 3F), −114 (m, 2F), −124.8 (s, 2F), −126.5 (m, 2F).

A 3-neck flask equipped with an air condenser, stopper and septa kept under nitrogen flush was charged with dry dichloromethane (100 mL). The flask was cooled to 15° C. and added poly(ethylene glycol) bis(carboxymethyl) ether (Mw ~600, average n=10-11, 2.0 grams) followed by 1-[3-(dimethylamino)propyl]-3-ethylcarbodiimide hydrochloride (EDCI) (1.28 g) and 4-(dimethylamino)pyridine (0.815 g). The mixture was stirred for 10 minutes and to the resulting suspension was added $C_4F_9CH_2CH_2SCH_2CH_2NH_2$ (2.92 g). The reaction mixture was warmed to room temperature and allowed to stir overnight. GC-analysis showed the complete conversion of fluorinated amine to the amide. The resulting clear solution was transferred to a separatory funnel and washed with 2% HCl (2×50 mL), saturated $NaHCO_3$ solution (2×50 mL) and brine (1×50 mL). The organic layer was dried (anhydrous $MgSO_4$), concentrated and dried under vacuum to provide the corresponding fluorinated poly(ethylene glycol)-diamide, $C_4F_9CH_2CH_2SCH_2CH_2NHCOCH_2O(CH_2CH_2O)_nCH_2CONHCH_2CH_2SCH_2CH_2—C_4F_9$, (4.03 g) as a light brown oil. IR, neat, 1672 $cm^{-1}$, C=O stretch of amide, 3346 $cm^{-1}$ N—H stretch of amide: $^1H$ NMR ($CDCl_3$): δ 7.4 (bs, 2H, NH), 3.98 (s, 4H, $COCH_2O$), 3.66 (bs, PEG $OCH_2^s$), 3.47 (q, J=4.8 Hz, 4H, $NHCH_2$), 2.78 (t, J=6.4 Hz, 4H, $SCH_2$), 2.37 (m, 4H, $CF_2CH_2$): $^{19}F$ NMR ($CDCl_3$): δ −81.2 (m, 6F), −114.6 (m, 4F), −124.9 (s, 4F), −126.4 (m, 4F). The product from the above preparation having the structure of $C_4F_9CH_2CH_2SCH_2CH_2NHCOCH_2—(CH_2CH_2O)_n—CH_2CONHCH_2CH_2SCH_2CH_2C_4F_9$, was evaluated for CMC and surface tension beyond the CMC by Test Method 1; the results are shown in Table 2. The product was also evaluated for performance as a wetting and leveling agent in a commercial floor polish Rhoplex® 3829 (N-29-1) available from Rohm & Haas, Spring House, Pa., according to Test Method 2. In a control, no leveling agent was added. All samples were measured at 75 ppm (microgram/g) loading, and at the same time, to nullify potential variations in room humidity and temperature. The results are listed in Table 3, with a higher rating indicating superior performance.

Example 2

10 g of polyethylene glycol (Mw ~400, 10.0 g) in acetone (400 mL) was cooled to 15° C. and Jones reagent was added [(43 mL), prepared from 5.18 mL $H_2SO_4$, 5 g of $CrO_3$ and 38 mL $H_2O$]. The mixture was stirred at room temperature for 12 h. The acetone was removed under vacuum, the slurry dissolved in $CH_2Cl_2$ (150 mL) and washed with saturated NaCl solution (1×100 mL). The $CH_2Cl_2$ layer was dried (anhydrous $MgSO_4$) and solvents removed to obtain corresponding poly (ethylene glycol) bis(carboxymethyl) ether (Mw ~400) as an oil (9.35 g). IR, neat, 1739 $cm^{-1}$, C=O stretch of carboxylic acid, 3436 $cm^{-1}$ Broad O'H stretch.

By following the procedure as described in Example 1, using poly(ethylene glycol) bis(carboxymethyl) ether (Mw ~400, average n=6-7, 2.0 g) and $C_4F_9CH_2CH_2SCH_2CH_2NH_2$ (1.62 g), the corresponding fluorinated poly(ethylene glycol)-diamide, $C_4F_9CH_2CH_2SCH_2CH_2NHCOCH_2O—(CH_2CH_2O)_n—CH_2CONHCH_2CH_2SCH_2CH_2C_4F_9$, (2.0 g) was produced as a brown oil. IR, neat, 1672 $cm^{-1}$, C=O stretch of amide, 3341 $cm^{-1}$ N—H stretch of amide: $^{19}F$ NMR ($CDCl_3$): δ −81.3 (m, 6F), −114.7 (m, 4F), −124.9 (s, 4F), −126.5 (m, 4F).

The product was evaluated for CMC and surface tension beyond the CMC by Test Method 1; the results are shown in Table 2.

Example 3

By following the procedure as described in Example 1, using polyethylene glycol (Mw ~1000, 10.0 g) and Jones reagent (17 mL) the corresponding poly(ethylene glycol) bis (carboxymethyl) ether (Mw ~1000) was produced as white crystalline solid (8.62 g). IR, neat, 1740 $cm^{-1}$, C=O stretch of carboxylic acid, 3436 $cm^{-1}$ Broad O—H stretch:

By following the procedure as described in Example 1, using poly(ethylene glycol) bis(carboxymethyl) ether (Mw ~1000, average n=19-20, 2.0 g) and $C_4F_9CH_2CH_2SCH_2CH_2NH_2$ (1.29 g), the corresponding fluorinated poly(ethylene glycol) diamide, $C_4F_9CH_2CH_2SCH_2CH_2NHCOCH_2O—(CH_2CH_2O)_n—CH_2CONHCH_2CH_2SCH_2CH_2C_4F_9$, (2.59 g) was produced as a orange solid. IR, neat, 1672 $cm^{-1}$, C=O stretch of amide, 3348 $cm^{-1}$ N—H stretch of amide: $^{19}F$ NMR ($CDCl_3$): δ −81.4 (m, 6F), −114.8 (m, 4F), −124.7 (s, 4F), −126.4 (m, 4F). The product was evaluated for CMC and surface tension beyond the CMC by Test Method 1; the results are shown in Table 2.

Example 4

By following the procedure as described in Example 1, using polyethylene glycol (Mw ~1450, 10.0 g) and Jones reagent (12 mL) the corresponding poly(ethylene glycol) bis (carboxymethyl) ether (Mw ~1000) was produced as a white crystalline solid (8.14 g). IR, neat, 1739 $cm^{-1}$, C=O stretch of carboxylic acid, 3429 $cm^{-1}$ Broad O—H stretch:

By following the procedure as described in Example 1, using poly(ethylene glycol) bis(carboxymethyl) ether (Mw ~1450, average n=29-30, 2.0 g) and $C_4F_9CH_2CH_2SCH_2CH_2NH_2$ (0.904 g), the corresponding fluorinated poly(ethylene glycol) diamide, $C_4F_9CH_2CH_2SCH_2CH_2NHCOCH_2O—(CH_2CH_2O)_n—CH_2CONHCH_2CH_2SCH_2CH_2C_4F_9$, (1.67 g) was produced as a pale yellow solid. IR, neat, 1673 $cm^{-1}$, C=O stretch of amide, 3347 $cm^{-1}$ N—H stretch of amide: $^{19}F$ NMR ($CDCl_3$): δ −81.4 (m, 6F), −114.8 (m, 4F), −124.8 (s, 4F), −126.4 (m, 4F). The product was evaluated for CMC and surface tension beyond the CMC by Test Method 1; the results are shown in Table 2.

Example 5

1H,1H-perfluoroheptylamine ($C_6F_{13}CH_2NH_2$) was obtained from Matrix Scientific, Columbia, S.C. By following the procedure as described in Example 1, using poly (ethylene glycol) bis(carboxymethyl) ether (Mw ~600, average n=10-11, 2.0 g) and $C_6F_{13}CH_2NH_2$ (2.44 g), the corresponding fluorinated poly(ethylene glycol) diamide, $C_6F_{13}CH_2NHCOCH_2O—(CH_2CH_2O)_n—CH_2CONHCH_2C_6F_{13}$, (3.21 g) was produced as a golden brown oil. IR, neat, 1693 $cm^{-1}$, C=O stretch of amide, 3326 $cm^{-1}$ N—H stretch of amide: $^{19}F$ NMR ($CDCl_3$): δ −81.2 (m, 6F), −118.2 (m, 4F), −121.9 (m, 4F), −122.3 (m, 4F), −124.0

(m, 4F), −126.5 (m, 4F). The product was evaluated for CMC and surface tension beyond the CMC by Test Method 1; the results are shown in Table 2. The product was also evaluated for performance as a wetting and leveling agent in a commercial floor polish Rhoplex® 3829 (N-29-1) available from Rohm & Haas, Spring House, Pa., according to Test Method 2. In a control, no leveling agent was added. All samples were measured at 75 ppm (microgram/g) loading, and at the same time, to nullify potential variations in room humidity and temperature. The results are listed in Table 3, with a higher rating indicating superior performance.

Example 6

A 500 mL four-neck reactor with a stirrer, thermocouple, nitrogen purge, addition funnel and jacketed condenser was purged with nitrogen and charged with a solution of sodium azide (40.1 g, 974.7 mmol) and tetrabutyl ammonium bromide (6.28 g, 19.5 mmol) and water (100 mL). 1H,1H,2H,2H-perfluorooctyl iodide (308 g, 649.8 mmol) was added to the reactor and heated to 90-95° C. with constant stirring for 12 h. The progress was monitored by GC analysis. Upon complete conversion, the flask was cooled to room temperature and the organic phase (azide) was washed five times with 25-mL portions of water. The resulting crude azide (250.0 g, 643.0 mmol, 98%) used directly for the next step.

A 1 L four-neck reactor with a stirrer, thermocouple, nitrogen purge, addition funnel and jacketed condenser was purged with nitrogen and charged with 1H,1H,2H,2H-perfluorooctyl azide (250.0 g, 643 mmol), Raney-Ni (4.2 g) and water (250 mL). The hydrazine hydrate was added to this mixture via the addition funnel (28.2 g, 978.3 mmol) keeping the temperature at RT. The mixture was then progressively heated to 60° C. for 8 h. After the reaction was complete (by GC analysis), the mixture was cooled to room temperature, extracted with dichloromethane (4×400 mL) and dried over anhydrous $MgSO_4$. Evaporation of the solvent followed by distillation under reduced pressure produced pure 1H,1H,2H,2H-perfluorooctyl amine as a colorless liquid (167.7 g, 462 mmol, 72%) bp: 56° C. @18 mm Hg. $^1$H NMR ($CDCl_3$): δ 3.08 (t, J=7.0 Hz, 2H), 2.27 (m, 2H). $^{19}$F NMR ($CDCl_3$): δ −81.4 (m, 3F) −114.1 (m, 2F), −122.4 (m, 2F), −123.4 (m, 2F), −124.2 (m, 2F), −126.6 (m, 2F).

A 3-neck flask equipped with an air condenser, stopper and septa kept under nitrogen flush was charged with dry dichloromethane (100 mL). The flask was cooled to 15° C. and added poly(ethylene glycol) bis(carboxymethyl) ether (Mw ~600, average n=10-11, 2.0 grams) followed by 1-[3-(dimethylamino)propyl]-3-ethylcarbodiimide hydrochloride (EDCI) (1.28 g) and 4-(dimethylamino)pyridine (0.815 g). The mixture was stirred for 10 minutes and to the resulting suspension was added $C_6F_{13}CH_2CH_2NH_2$ (2.42 g). The reaction mixture was warmed to room temperature and allowed to stir overnight. GC-analysis showed the complete conversion of fluorinated amine to the amide. The resulting clear solution was transferred to a separatory funnel and washed with 2% HCl (2×50 mL), saturated $NaHCO_3$ solution (2×50 mL) and brine (1×50 mL). The organic layer was dried (anhydrous $MgSO_4$), concentrated and dried under vacuum to provide fluorinated poly(ethylene glycol) diamide, $C_6F_{13}CH_2CH_2NHCOCH_2O$—$(CH_2CH_2O)_n$—$CH_2CONHCH_2CH_2C_6F_{13}$, (4.05 g) as a colorless oil. IR, neat, 1673 cm$^{-1}$, C=O stretch of amide, 3341 cm$^{-1}$ N—H stretch of amide. $^1$H NMR ($CDCl_3$): δ 7.4 (bs, 2H, NH), 4.10 (s, 4H, $COCH_2$), 3.68 (bs, 4H, $NHCH_2$), 3.65 (bs, PEG $OCH_2{}^s$), 2.32 (m, 4H, $CF_2CH_2$): $^{19}$F NMR ($CDCl_3$): 6-81.2 (m, 6F), −114.4 (m, 4F), −122.2 (s, 4F), −123.2 (s, 4F), −124.0 (s, 4F), −126.5 (m, 4F). The product from the above preparation was evaluated for CMC and surface tension beyond the CMC by Test Method 1; the results are shown in Table 2.

Example 7

By following the procedure as described in Example 6, using poly(ethylene glycol) bis(carboxymethyl) ether (Mw ~400, average n=6-7, 1.0 g) prepared as in Example 2, and $C_6F_{13}CH_2CH_2NH_2$ (1.82 g) prepared as in Example 6, the corresponding fluorinated poly(ethylene glycol) diamide (1.5 g) $C_6F_{13}CH_2CH_2NHCOCH_2$—$(CH_2CH_2O)_n$—$CH_2CONHCH_2CH_2C_6F_{13}$ was produced as a brown oil. IR, neat, 1671 cm$^{-1}$, C=O stretch of amide, 3370 cm$^{-1}$ N—H stretch of amide: $^{19}$F NMR ($CDCl_3$): δ −81.3 (m, 6F), −114.5 (m, 4F), −122.4 (s, 4F), −123.3 (s, 4F), −124.0 (s, 4F), −126.6 (m, 4F). The product was evaluated for CMC and surface tension beyond the CMC by Test Method 1; the results are shown in Table 2.

Example 8

By following the procedure as described in Example 6, using poly(ethylene glycol) bis(carboxymethyl) ether (Mw ~1000, average n=19-20, 2.0 g) prepared as in Example 3, and $C_6F_{13}CH_2CH_2NH_2$ (1.45 g) prepared as in Example 6, the corresponding fluorinated poly(ethylene glycol) diamide (2.07 g), $C_6F_{13}CH_2CH_2NHCOCH_2O$—$(CH_2CH_2O)_n$—$CH_2CONHCH_2CH_2C_6F_{13}$ was produced as a pale yellow solid. IR, neat, 1671 cm$^{-1}$, C=O stretch of amide, 3347 cm$^{-1}$ N—H stretch of amide: $^{19}$F NMR ($CDCl_3$): δ −81.2 (m, 6F), −114.5 (m, 4F), −122.2 (s, 4F), −123.2 (s, 4F), −123.9 (s, 4F), −126.5 (m, 4F). The product was evaluated for CMC and surface tension beyond the CMC by Test Method 1; the results are shown in Table 2.

Example 9

By following the procedure as described in Example 6, using poly(ethylene glycol) bis(carboxymethyl) ether (Mw ~1450, average n=29-30, 2.0 g) prepared as in Example 4 and $C_6F_{13}CH_2CH_2NH_2$ (1.02 g) prepared as in Example 6, the corresponding fluorinated poly(ethylene glycol) diamide (1.7 g), $C_6F_{13}CH_2CH_2NHCOCH_2O$—$(CH_2CH_2O)_n$—$CH_2CONHCH_2CH_2C_6F_{13}$, was produced as a pale yellow solid. IR, neat, 1673 cm$^{-1}$, C=O stretch of amide, 3350 cm$^{-1}$ N—H stretch of amide: $^{19}$F NMR ($CDCl_3$): δ −81.2 (m, 6F), −114.4 (m, 4F), −122.2 (s, 4F), −123.2 (s, 4F), −124.0 (s, 4F), −126.5 (m, 4F). The product was evaluated for CMC and surface tension beyond the CMC by Test Method 1; the results are shown in Table 2.

Comparative Example A

A 4-neck flask with condenser, Dean-Stark trap, magnetic stirrer, thermocouple, and heating mantle was charged with poly(ethylene glycol) bis(carboxymethyl) ether (Mw ~250, average n=3, 5.0 grams), Zonyl BA-N alcohol (20.6 grams, a perfluoroalkyl ethyl alcohol commercially availalble from E. I. du Pont de Nemours and Company, Wilmington, Del., wherein the perfluoroalkyl is a mixture of homologues of perfluoroalkyl chains containing from 6 to 20 carbon atoms), p-toluene sulfonic acid (0.26 grams), and toluene (100 grams). After refluxing for 15 hours, GC analysis confirmed formation of the di-ester. Calcium hydroxide (0.26 grams) was added and the precipitate was removed by filtering while hot, followed by the removal of toluene via the rotary evaporator. The reaction product was dissolved in about 500 mL of water followed by filtering to produce an approximately 5 weight percent aqueous solution of fluorinated poly(ethylene glycol) di-ester represented by the structure of $C_jF_{2j+1}CH_2CH_2OCOCH_2O-(CH_2CH_2O)_n-CH_2COOCH_2CH_2C_jF_{2j+1}$ wherein j is 6 to 20, and n is 3. The product was evaluated for CMC and surface tension beyond the CMC by Test Method 1; the results are shown in Table 2. The product was also evaluated for performance as a wetting and leveling agent in a commercial floor polish Rhoplex® 3829 (N-29-1) available from Rohm & Haas, Spring House, Pa., according to Test Method 2. In a control, no leveling agent was added. All samples were measured at 75 ppm (microgram/g) loading, and at the same time, to nullify potential variations in room humidity and temperature. The results are listed in Table 3, with a higher rating indicating superior performance.

Comparative Example B

Comparative Example B was a commercially available surfactant available from E. I. du Pont de Nemours and Company, Wilmington, Del., which was a fluoroalkyl ethoxylate nonionic surfactant in water prepared according to U.S. Pat. No. 5,567,857. The product was evaluated for performance as a wetting and leveling agent in a commercial floor polish Rhoplex® 3829 (N-29-1) available from Rohm & Haas, Spring House, Pa., according to Test Method 2. In a control, no leveling agent was added. All samples were measured at 75 ppm (microgram/g) loading, and at the same time, to nullify potential variations in room humidity and temperature. The results are listed in Table 3, with a higher rating indicating superior performance.

TABLE 2

Surface Tension of Compounds of Formula (1)
$R_a-X-COCH_2O-[-C_pH_{2p}O-]_n-CH_2COXR_a$

| Example** | $R_aX$ | PEG* Size (Mw) | Critical Micelle Concentration (% by weight) | Surface Tension Beyond CMC (mN/m) |
|---|---|---|---|---|
| 1 | $C_4F_9CH_2CH_2SCH_2CH_2NH$ | 600 | 0.01 | 20.6 |
| 2 | $C_4F_9CH_2CH_2SCH_2CH_2NH$ | 400 | 0.01 | 19.5 |
| 3 | $C_4F_9CH_2CH_2SCH_2CH_2NH$ | 1000 | 0.05 | 20.8 |
| 4 | $C_4F_9CH_2CH_2SCH_2CH_2NH$ | 1450 | 0.05 | 20.6 |
| 5 | $C_6F_{13}CH_2NH$ | 600 | 0.01 | 19.0 |
| 6 | $C_6F_{13}CH_2CH_2NH$ | 600 | 0.01 | 21.0 |
| 7 | $C_6F_{13}CH_2CH_2NH$ | 400 | 0.01 | 18.7 |
| 8 | $C_6F_{13}CH_2CH_2NH$ | 1000 | 0.01 | 23.1 |
| 9 | $C_6F_{13}CH_2CH_2NH$ | 1450 | 0.01 | 20.5 |
| Comparative A | $C_jF_{2j+1}CH_2CH_2O$ | 250 | 0.011 | 21.6 |

*Poly(ethylene glycol)
**Example was added to deionized water by weight based on solids of the additive in deionized water;
Standard Deviation <1 dynes/cm;
Temperature 23° C.

Normal surface tension of deionized water is 72 dyne/cm. When the above fluorinated polyoxyalkylene glycol diamide surfactants were added at a specified rate, the surface tension of each aqueous solution was reduced significantly. Examples 1-9 showed better or similar surface tension reduction compared to Comparative Example A.

TABLE 3

Ratings for Wetting and Leveling

| | Coating No. | | | | | |
|---|---|---|---|---|---|---|
| | 1 | 2 | 3 | 4 | 5 | |
| | | | Rating | | | Average |
| Control (Blank) | 1 | 1 | 1 | 1 | 1 | 1 |
| Comparative Example B | 1.5 | 2.5 | 3.5 | 4 | 4 | 3.1 |
| Comparative Example A | 1 | 2.5 | 3.5 | 4 | 4 | 3.0 |
| Example 1 | 1.5 | 2 | 3 | 4 | 4 | 2.9 |
| Example 5 | 2 | 3 | 4 | 4.5 | 4 | 3.5 |

The results indicate that the surfactants of Examples 1 and 5, which contained less fluorine that Comparative Examples A and B, showed wetting and leveling characteristics similar to that of Comparative Examples A and B.

What is claimed is:

1. A compound of formula (1):

$$B-X-COCH_2O-[-C_pH_{2p}O]_n-CH_2CO-X-R_a \quad (1)$$

wherein
B is M or $R_a$,
M is an ionizable hydrogen, ammonium, alkali metal, or alkaline earth metal,
p is from about 2 to about 4,
n is from about 5 to about 43,
each X is independently NR, $SCH_2CH_2NR$, $SO_2NRCH_2CH_2NR$, or $SO_2CH_2CH_2NR$,
R is hydrogen, or a linear or branched alkyl group $C_bH_{(2b+1)}$ wherein b is 1 to about 18,
$R_a$ is $R_f(CH_2CF_2)_d-(C_gH_{2g})-$; $R_f(OCF_2CF_2)_r-(C_gH_{2g})-$; $R_fOY-$; $R_f(CH_2)_h[(CF_2CF_2)_i(CH_2CH_2)_j]_k-$; $R_f(C_gH_{2g})-$; or $H(C_cF_{2c})-(C_gH_{2g})-$;
Y is $CFHCF_2O(C_wH_{2w})-$; or $CF(CF_3)CONH-(C_gH_{2g})-$;
each $R_f$ is independently $C_cF_{(2c+1)}$ wherein c is 1 to about 6;
d is 1 to about 3;
g is 1 to about 4;
r is 1 to about 4;
h is 1 to about 6;
w is from about 2 to about 12; and
i, j, and k are each independently 1, 2, or 3, or a mixture thereof; provided that the total number of carbon atoms in $R_f(CH_2)_h[(CF_2CF_2)_i(CH_2CH_2)_j]_k-$ is from about 8 to about 22.

2. The compound of claim 1 wherein, n is from about 6 to about 32.

3. The compound of claim 2 wherein, n is 10 to 12.

4. The compound of claim 1 wherein X is NR or $SCH_2CH_2NR$.

5. The compound of claim 1 wherein Ra is $R_f(C_gH_{2g})-$, $R_f$ is $C_cF_{(2c+1)}$ wherein c is 4 or 6, and g is 1 or 2.

6. The compound of claim 1 wherein $R_a$ is $R_f(CH_2CF_2)_d-(C_gH_{2g})-$; $R_f$ is $C_cF_{(2c+1)}$ wherein c is 4 or 6; d is 1 or 2; and g is 2.

7. The compound of claim 1 wherein $R_a$ is $R_f[OCF_2CF_2]_r-(C_gH_{2g})-$; $R_f$ is $C_cF_{(2c+1)}$ wherein c is 2 or 3; r is 1, 2 or 3; and g is 2.

8. The compound of claim 1 wherein $R_a$ is $R_fOY-$; $R_f$ is $C_cF_{(2c+1)}$ wherein c is 1, 2 or 3; Y is $CFHCF_2O(C_wH_{2w})-$; and w is 2, 3 or 4.

9. The compound of claim 1 wherein $R_a$ is $R_fOY-$; $R_f$ is $C_cF_{(2c+1)}$ wherein c is 3; Y is $CF(CF_3)CONH-(C_gH_{2g})-$; and g is 2.

10. The compound of claim 1 wherein $R_a$ is $R_f(CH_2)_h[(CF_2CF_2)_i(CH_2CH_2)_j]_k$; $R_f$ is $C_cF_{(2c+1)}$ wherein c is 1, 2, or 3; h is 2; k is 1, 2 or 3; i and j are each 1, and X is O or $SCH_2CH_2O$.

11. A compound of claim 1, or a mixture thereof, having a surface tension of less than about 21 mN/M at a concentration of 0.1% by weight in water.

12. A compound of claim 1, or a mixture thereof, having a surface tension of less than about 20 mN/M at a concentration of 0.1% by weight in water.

13. A method of altering the surface behavior of a liquid comprising adding to the liquid the compound of formula (1) or a mixture thereof:

$$B{-}X{-}COCH_2O{-}[{-}C_pH_{2p}O{-}]_n{-}CH_2CO{-}X{-}R_a \quad (1)$$

wherein

B is M or $R_a$,

M is an ionizable hydrogen, ammonium, alkali metal, or alkaline earth metal, p is from about 2 to about 4, n is from about 5 to about 43, each X is independently NR, S, $SCH_2CH_2NR$, $SO_2NRCH_2CH_2NR$, or $SO_2CH_2CH_2NR$;

R is hydrogen, or a linear or branched alkyl group $C_bH_{(2b+1)}$ wherein b is 1 to about 18, $R_a$ is $R_f(CH_2CF_2)_d{-}(C_gH_{2g}){-}$; $R_f(OCF_2CF_2)_r{-}(C_gH_{2g}){-}$; $R_fOY{-}$; $R_f(CH_2)_h[(CF_2CF_2)_i(CH_2CH_2)_j]_k{-}$; $R_f(C_gH_{2g}){-}$; or $H(C_cF_{2c}){-}(C_gH_{2g}){-}$;

Y is $CFHCF_2O(C_wH_{2w}){-}$; or $CF(CF_3)CONH{-}(C_gH_{2g}){-}$;

each $R_f$ is independently $C_cF_{(2c+1)}$ wherein c is 1 to about 6;

d is 1 to about 3;

g is 1 to about 4;

r is 1 to about 4;

h is 1 to about 6;

w is from about 2 to about 12; and i, j, and k are each independently 1, 2, or 3, or a mixture thereof; provided that the total number of carbon atoms in $R_f(CH_2)_h[(CF_2CF_2)_i(CH_2CH_2)_j]_k{-}$ is from about 8 to about 22.

14. The method of claim 13 wherein the altering the surface behavior is lowering the surface tension.

15. The method of claim 13 wherein the surface behavior is selected from the group consisting of wetting, penetration, spreading, leveling, flowing, emulsifying, dispersing, repelling, releasing, lubricating, etching, bonding, and stabilizing.

16. The method of claim 13 wherein the liquid is a coating composition, latex, polymer, floor finish, ink, emulsifying agent, foaming agent, release agent, repellency agent, flow modifier, film evaporation inhibitor, wetting agent, penetrating agent, cleaner, grinding agent, electroplating agent, corrosion inhibitor, etchant solution, soldering agent, dispersion aid, microbial agent, pulping aid, rinsing aid, polishing agent, personal care composition, drying agent, antistatic agent, floor finish, or bonding agent.

* * * * *